US010511446B2

(12) United States Patent
Dan et al.

(10) Patent No.: US 10,511,446 B2
(45) Date of Patent: Dec. 17, 2019

(54) METHODS AND APPARATUS FOR SECURE DEVICE PAIRING FOR SECURE NETWORK COMMUNICATION INCLUDING CYBERSECURITY

(71) Applicant: Cisco Technology, Inc., San Jose, CA (US)

(72) Inventors: Ronnie Dan, Modiin (IL); Hugo Mike Latapie, Long Beach, CA (US); Andre Jean-Marie Surcouf, St Leu la Foret (FR); Enzo Fenoglio, Issy-les-Moulineaux (FR); Thierry Gruszka, Le Raincy (FR)

(73) Assignee: Cisco Technology, Inc., San Jose, CA (US)

( * ) Notice: Subject to any disclaimer, the term of this patent is extended or adjusted under 35 U.S.C. 154(b) by 147 days.

(21) Appl. No.: 15/713,463

(22) Filed: Sep. 22, 2017

(65) Prior Publication Data

US 2019/0097809 A1 Mar. 28, 2019

(51) Int. Cl.
*H04L 29/06* (2006.01)
*H04L 9/32* (2006.01)
(Continued)

(52) U.S. Cl.
CPC .............. *H04L 9/3247* (2013.01); *H04L 9/14* (2013.01); *H04L 9/3271* (2013.01); *H04L 63/02* (2013.01);
(Continued)

(58) Field of Classification Search
CPC ....... H04L 9/3247; H04L 9/14; H04L 9/3271; H04L 63/0428; H04L 63/1408
See application file for complete search history.

(56) References Cited

U.S. PATENT DOCUMENTS 9,112,894 B2    8/2015  Ramadass et al.
9,436,819 B2    9/2016  Priev et al.
(Continued)

OTHER PUBLICATIONS

Yang et al., "Deep Multimodal Representation Learning from Temporal Data", University of Maryland, College Park, PARC, Conduent Labs US, United Technologies, University of Rochester, pp. 1-9, Apr. 11, 2017.
(Continued)

*Primary Examiner* — Mohammad A Siddiqi
(74) *Attorney, Agent, or Firm* — Behmke Innovation Group LLC; James Behmke; Stephen D. LeBarron

(57) ABSTRACT

In one illustrative example, a network cybersecurity procedure may be employed with use of at least one unmanned aerial vehicle (UAV), where the UAV includes an intermediary pairing device for providing a temporary connection between a first network (e.g. a private LAN) and a second network (e.g. the Internet). The network cybersecurity procedure may involve deploying the UAV in proximity to the first network, such that the intermediary pairing device pairs with a first pairing device via a first transceiver and with a second pairing device via a second transceiver. A temporary connection is established between the first network connected via the first pairing device and the second network connected via the second pairing device. Data is communicated between a first device (e.g. IoT device) or server of the first network and a second device or server of the second network over the temporary connection. During this time, the intermediary pairing device executes a cybersecurity service function. Once completed, the UAV may be withdrawn out of proximity of the first network. One or more features of the cybersecurity service function may be updated and the UAV redeployed. Multimodal data fusion techniques with use of a plurality of network and device
(Continued)

sensors may be employed for device verification and/or anomaly detection.

11 Claims, 14 Drawing Sheets

(51) Int. Cl.
*H04L 9/14* (2006.01)
*H04L 29/08* (2006.01)
*H04W 4/38* (2018.01)
*H04W 4/70* (2018.01)

(52) U.S. Cl.
CPC ...... *H04L 63/0428* (2013.01); *H04L 63/0869* (2013.01); *H04L 63/1408* (2013.01); *H04L 67/12* (2013.01); *H04W 4/38* (2018.02); *H04L 2209/127* (2013.01); *H04L 2209/80* (2013.01); *H04L 2209/84* (2013.01); *H04W 4/70* (2018.02)

(56) References Cited

U.S. PATENT DOCUMENTS

| | | | |
|---|---|---|---|
| 9,942,262 B1* | 4/2018 | Horowitz | H04L 67/12 |
| 2004/0111512 A1 | 6/2004 | Barth | |
| 2011/0197060 A1 | 8/2011 | Mukherjee | |
| 2013/0041997 A1 | 2/2013 | Li et al. | |
| 2013/0291085 A1 | 10/2013 | Chong et al. | |
| 2014/0094124 A1* | 4/2014 | Dave | H04W 8/005 455/41.2 |
| 2014/0324973 A1 | 10/2014 | Goel et al. | |
| 2014/0351337 A1 | 11/2014 | Pal et al. | |
| 2015/0381776 A1 | 12/2015 | Seed et al. | |
| 2016/0105305 A1 | 4/2016 | Pignataro et al. | |
| 2016/0337127 A1 | 11/2016 | Schultz et al. | |
| 2016/0378996 A1 | 12/2016 | Smith et al. | |
| 2017/0034700 A1 | 2/2017 | Cohen et al. | |
| 2017/0124676 A1* | 5/2017 | Kreitzer | G06Q 10/063112 |
| 2017/0150308 A1* | 5/2017 | Jones | H04W 4/021 |
| 2017/0201385 A1 | 7/2017 | Kravitz et al. | |
| 2017/0250974 A1* | 8/2017 | Antonyraj | H04L 9/0894 |
| 2018/0288599 A1* | 10/2018 | Zhao | G08B 27/001 |
| 2018/0295516 A1* | 10/2018 | Chen | H04W 12/02 |
| 2018/0322749 A1* | 11/2018 | Kempel | G08B 13/19608 |

OTHER PUBLICATIONS

Bezemskij et al., "Threat Evaluation Based on Automatic Sensor Signal Characterisation and Anomaly Detection", The Twelfth International Conference on Autonomic and Autonomous Systems, Department of Greenwhich, University of Greenwhich, pp. 25-31, 2016.

Tchouchenkov et al., "Detection and Protection Against Unwanted Small UAV's", The Eleventh International Conference on Systems, pp. 26-29, 2016.

Miettinen et al., "IoT Sentinel: Automated Device-Type Identification for Security Enforcement in IoT", pp. 1-11, Dec. 13, 2016.

Lahat et al., "Multimodal Data Fusion: An Overview of Methods, Challenges and Prospects", IEEE, Institute of Electrical and Electronics Engineers, pp. 1449-1477, 2015.

Guiry et al., "Multi-Sensor Fusion for Enhanced Contextual Awareness of Everyday Activities with Ubiquitous Devices", Sensors 14, pp. 5687-5701, 2014.

Varshavsky et al., "Amigo: Proximity-Based Authentication of Mobile Devices", UbiComp, LNCS 4717, pp. 253-570, 2007.

* cited by examiner

METHODS AND APPARATUS FOR SECURE DEVICE PAIRING FOR SECURE NETWORK COMMUNICATION INCLUDING CYBERSECURITY

TECHNICAL FIELD

The present disclosure relates generally to methods and apparatus for secure device pairing for secure network communication including cybersecurity.

BACKGROUND

FIG. 1 is an illustration of a system 100 including a first network 102 and a second network 104. First network 102 may be a public or private local area network (LAN) or the like, and second network 102 may be a wide area network (WAN), such as the Internet. A first device 110 and a first server 112 may be connected in first network 102, and a second device 114 and a second server 116 may be connected in second network 104. A controller 110, such as an industrial controller, may further be connected and utilized in first network 102.

It may be desirable to connect the first network 102 and the second network 104 to provide communications between the devices and servers in those networks. However, cybersecurity attacks, eavesdropping, data breaches, etc. are becoming more commonplace and severe. These risks are often increased when first network 102 includes vulnerabilities, such as older, legacy equipment and/or Internet of Things (IoT) devices.

There is an ongoing need for advancing and improving devices, networks, and communications in the above-described environment, as well as advancing and improving devices, networks, and communications associated with other similar or even unrelated environments.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 8 and 9c;

Figure 1:
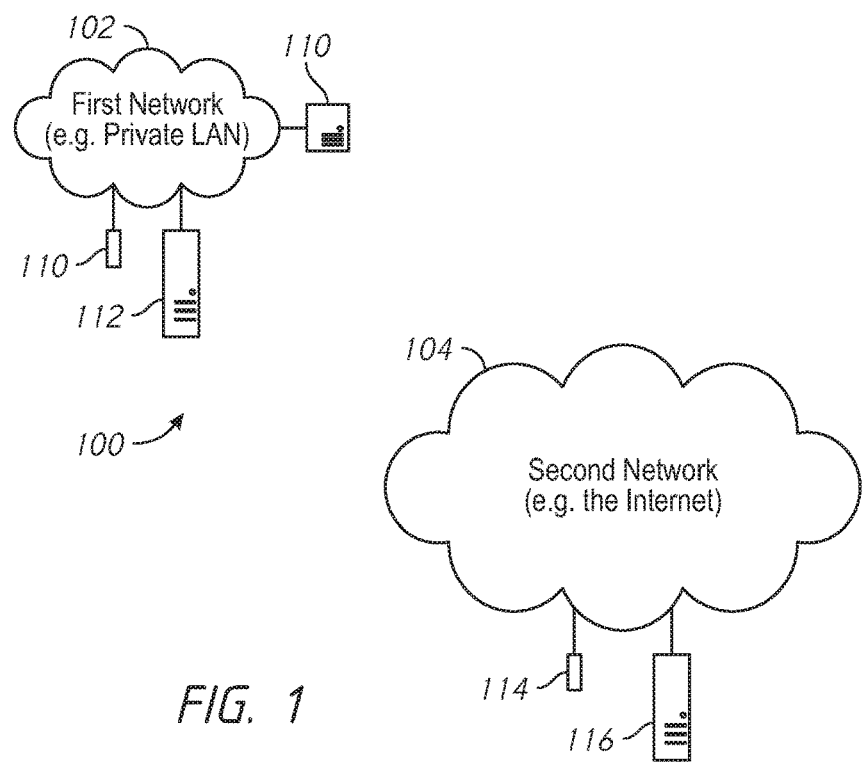
FIG. 1 is an illustration of a system which includes a first network and a second network.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Methods and apparatus for secure device pairing for secure network communications including cybersecurity are described herein.

Network Cybersecurity Procedure Using One or More Unmanned Aerial Vehicles.

In one illustrative example, a network cybersecurity procedure may be employed with use of at least one unmanned aerial vehicle (UAV) or drone, where the UAV includes an intermediary pairing device for providing a temporary connection between a first network (e.g. a private LAN) and a second network (e.g. the Internet). The network cybersecurity procedure may involve deploying the UAV in proximity to the first network, such that the intermediary pairing device pairs with a first pairing device via a first transceiver and with a second pairing device via a second transceiver. A temporary connection may be established between the first network connected via the first pairing device and the second network connected via the second pairing device. Data may be communicated between a first device (e.g. IoT device) or server of the first network and a second device or server of the second network over the temporary connection. During this time, the intermediary pairing device executes a cybersecurity service function, such as a firewall service function, an intrusion detection function, or an antivirus detection and protection service function. Once completed, the UAV may be withdrawn out of proximity of the first network. One or more features of the cybersecurity service function may be updated where the UAV is later redeployed. Multimodal data fusion techniques with use of a plurality of network and device sensors may further be employed for device verification and/or anomaly detection.

Intermediary Pairing Device (e.g. Included in a UAV).

In another illustrative example, an apparatus (e.g. a UAV) includes an intermediary pairing device having one or more processors and first and second transceivers coupled to the one or more processors. The first and the second transceivers may be, for example, radio frequency (RF) transceivers, or alternatively optical transceivers configured for free-space optical communications with the first and the second pairing devices. The one or more processors may be configured to pair with a first pairing device via the first transceiver and with a second pairing device via the second transceiver, for establishing a temporary connection between a first network (e.g. a public or private LAN) connected via the first pairing device and a second network (e.g. a wide area network such as the Internet) connected via the second pairing device. The one or more processors may further be configured to transfer data between the first and the second pairing devices via the first and the second transceivers for communicating, over the temporary connection, the data between a first device or server of the first network and a second device or server of the second network. The one or more processors may further be configured to execute a cybersecurity service function of a cybersecurity service module for the data transfer. The cybersecurity service module may be, for example, a firewall service module, an intrusion detection module, or an antivirus detection and protection service module, as a few examples.

The one or more processors may include a secure cryptoprocessor configured to operate in accordance with a Trusted Platform Module (TPM), where the secure cryptoprocessor is configured to provide (e.g. to the first device in the first network) an encryption key for encryption of the data. In addition or alternatively, the one or more processors may be configured to perform, with the first pairing device, a challenge-response authentication procedure with use of an encryption key provided by the secure cryptoprocessor, as a condition for establishing or maintaining the pairing with the first pairing device.

In some implementations, the intermediary pairing device further includes one or more sensor devices coupled to the one or more processors. Here, the one or more processors are further configured to receive, from each one of the sensor devices, ambient sensor data, and derive one or more signature features based on the ambient sensor data from each one of the sensor devices for producing a signature profile of the intermediary pairing device. The signature profile of the intermediary pairing device may be used for verification of the intermediary pairing device, as a condition for establishing or maintaining the pairing with the first device. The one or more sensor devices may be or include, for example, a camera for ambient image or video data, a microphone for ambient sound data, a radio frequency (RF) receiver for ambient RF data, and a temperature sensor device for ambient temperature data.

Pairing Device (e.g. Included in a Fixed-Position Connector).

In yet another illustrative example, an apparatus (e.g. a fixed position connector attached to a network) may comprise a pairing device including one or more processors, a network interface coupled to the one or more processors and configured to connect to a first network or device of the first network; and a transceiver coupled to the one or more processors. The transceiver may be, for example, an RF transceiver, or alternatively an optical transceiver configured for free-space optical communications with another pairing device (e.g. which may be included in a UAV). The one or more processors may be configured to pair with the other pairing device via the transceiver, for establishing a temporary connection between the first network connected via the network interface and a second network connected via the other pairing device. The one or more processors may be further configured to transfer data with the other pairing device via the transceiver for communicating, over the temporary connection, the data between a first device (e.g. IoT or legacy device) of the first network and a second device or server of the second network. The one or more processors may include a secure cryptoprocessor configured to operate in accordance with a Trusted Platform Module (TPM). The data from the first device may be encrypted with use of an encryption key provided by the secure cryptoprocessor (e.g. to the first device in the first network). During the data transfer, the one or more processors may be further configured to execute a cybersecurity service function of a cybersecurity service module. The cybersecurity service module may be, for example, a firewall service module, an intrusion detection module, or an antivirus detection and protection service module, as a few examples.

The one or more processors may further be configured to perform, with the other pairing device, a challenge-response authentication procedure with use of an encryption key provided by the secure cryptoprocessor, as a condition for establishing or maintaining the pairing with the other pairing device. In some implementations, the pairing device further includes one or more sensor devices coupled to the one or more processors. Here, the one or more processors are further configured to receive, from each one of the sensor devices, ambient sensor data, and derive one or more signature features based on the ambient sensor data from each one of the sensor devices for producing a signature profile of the pairing device. The signature profile of the pairing device may be used for verification of the pairing device, as a condition for establishing or maintaining the pairing with the other pairing device. The one or more sensor devices may be or include, for example, a camera for ambient image or video data, a microphone for ambient sound data, a radio frequency (RF) receiver for ambient RF data, and a temperature sensor device for ambient temperature data.

Alternative Pairing Device (e.g. Included in a UAV).

In another illustrative example, an apparatus (e.g. a UAV) includes a first pairing device having one or more processors and a transceiver coupled to the one or more processors. The transceiver may be, for example, a radio frequency (RF) transceiver, or alternatively an optical transceiver configured for free-space optical communications. The one or more processors may be configured to pair, via the transceiver, with a second pairing device which is connected to a network (e.g. a public or private LAN) for establishing a temporary connection with the network (e.g. a public or private LAN).

In some implementations, the one or more processors may be further configured to execute a cybersecurity service function(s) of a cybersecurity service module(s). The cybersecurity service module may be, for example, an intrusion detection module, or an antivirus detection and protection service module, as a few examples. Such cybersecurity service functions may provide for adequate detection and protection with respect to components, servers, and devices (e.g. IoT devices) in the network. The cybersecurity service module may be updated regularly, with regular deployment of the UAV for the network.

In addition or alternatively, the one or more processors may include a secure cryptoprocessor configured to operate in accordance with a Trusted Platform Module (TPM), where the secure cryptoprocessor is configured to provide an encryption key for the first pairing device. The one or more processors may be configured to perform, with the second pairing device, a challenge-response authentication procedure with use of an encryption key provided by the secure cryptoprocessor, as a condition for establishing or maintaining the pairing with the second pairing device.

In some implementations, the first pairing device further includes one or more sensor devices coupled to the one or more processors. Here, the one or more processors are further configured to receive, from each one of the sensor devices, ambient sensor data, and derive one or more signature features based on the ambient sensor data from each one of the sensor devices for producing a signature profile of the first pairing device. The signature profile of the first pairing device may be used for verification of the first pairing device, as a condition for establishing or maintaining the pairing with the second pairing device. The one or more sensor devices may be or include, for example, a camera for ambient image or video data, a microphone for ambient sound data, a radio frequency (RF) receiver for ambient RF data, and a temperature sensor device for ambient temperature data.

Server-Based Verification Procedure Using a Multimodal Data-Fused Neural Network for Anomaly Detection.

In yet even another illustrative example, a method may be employed at a server for a verification procedure for verifying one or more pairing devices using a multimodal data-fused neural network for anomaly detection.

In such a method, the server obtains, during a first time period, a signature profile $SIGP_{N1}$ associated with a first network N1. The signature profile $SIGP_{N1}$ is based on at least a first signature feature $SIG1_{N1}$ of the first network N1 and a second signature feature $SIG2_{N1}$ of the first network N1, where the first signature feature $SIG1_{N1}$ is derived from first ambient sensor data $SD1_{N1}$ from a first sensor device $SI_{N1}$ in the first network N1 and the second signature feature $SIG2_{N1}$ is derived from second ambient sensor data $SD2_{N1}$ from a second sensor device $S2_{N1}$ in the first network N1.

In addition, the server obtains, during the first time period, a signature profile $SIGP_{D1}$ associated with a first device D1 comprising a pairing device connected to the first network N1. The pairing device may be included in a fixed-position connector in the first network N1. The signature profile $SIGP_{D1}$ is based on at least a first signature feature $SIG1_{D1}$ of the first device D1 and a second signature feature $SIG2_{D1}$ of the first device D1, where the first signature feature $SIG1_{D1}$ is derived from first ambient sensor data $SD1_{D1}$ from a first sensor device $S1_{D1}$ of the first device D1 and the second signature feature $SIG2_{D1}$ is derived from second ambient sensor data $SD2_{D1}$ from a second sensor device $S2_{D1}$ of the first device D1. The first sensor device $S1_{D1}$ may be the first type of sensor device and the second sensor device $S2_{D1}$ may be the second type of sensor device.

The first and the second type of sensor devices may include, for example, one or more of the following: a camera for ambient image or video data, a microphone for ambient sound data, a radio frequency (RF) receiver for ambient RF data, and a temperature sensor device for ambient temperature data.

The server operates to train, during the first time period, the multimodal data-fused neural network having inputs which include the signature profile $SIGP_{N1}$ associated with the first network N1 and the signature profile $SIGP_{D1}$ associated with the first device D1.

After the training, the server obtains, during a second time period, a signature profile $SIGP_{D2}$ associated with a second device D2 comprising an intermediary pairing device configured to pair with the first device D1. The intermediary pairing device may be included in an unmanned aerial vehicle (UAV). The signature profile $SIGP_{D2}$ is based on at least a first signature feature $SIG1_{D2}$ of the second device D2 and a second signature feature $SIG2_{D2}$ of the second device D2, where the first signature feature $SIG1_{D2}$ is derived from first ambient sensor data $SD1_{D2}$ from a first sensor device $S1_{D2}$ of the second device D2 and the second signature feature $SIG2_{D2}$ is derived from second ambient sensor data $SD2_{D2}$ from a second sensor device $S2_{D2}$ of the second device D2. The first sensor device $S1_{D2}$ may be the first type of sensor device and the second sensor device $S2_{D2}$ may be the second type of sensor device.

The server may input, during the second time period, the signature profile $SIGP_{D2}$ associated with the second device D2 into the trained neural network for verification of the second device D2 (e.g. based on anomaly detection). This verification procedure may be used as a condition for establishing or maintaining a pairing between the first device D1 and the second device D2. The pairing may be used for establishing a temporary connection between the first network N1 connected via the first device D1 and a second network connected via a third pairing device to which the second device D2 is paired. The temporary connection may be established for transferring data between a first device (IoT or legacy device) for server of the first network and a second device or server of the second network.

EXAMPLE EMBODIMENTS

Referring again to FIG. 1, it may be desirable to connect the first network 102 and the second network 104 to provide communications between the devices and servers in those networks. However, cybersecurity attacks, eavesdropping, data breaches, etc. are becoming more commonplace and severe. These risks are often increased when first network 102 includes vulnerabilities, such as older, legacy equipment and/or Internet of Things (IoT) devices.

Figure 2:
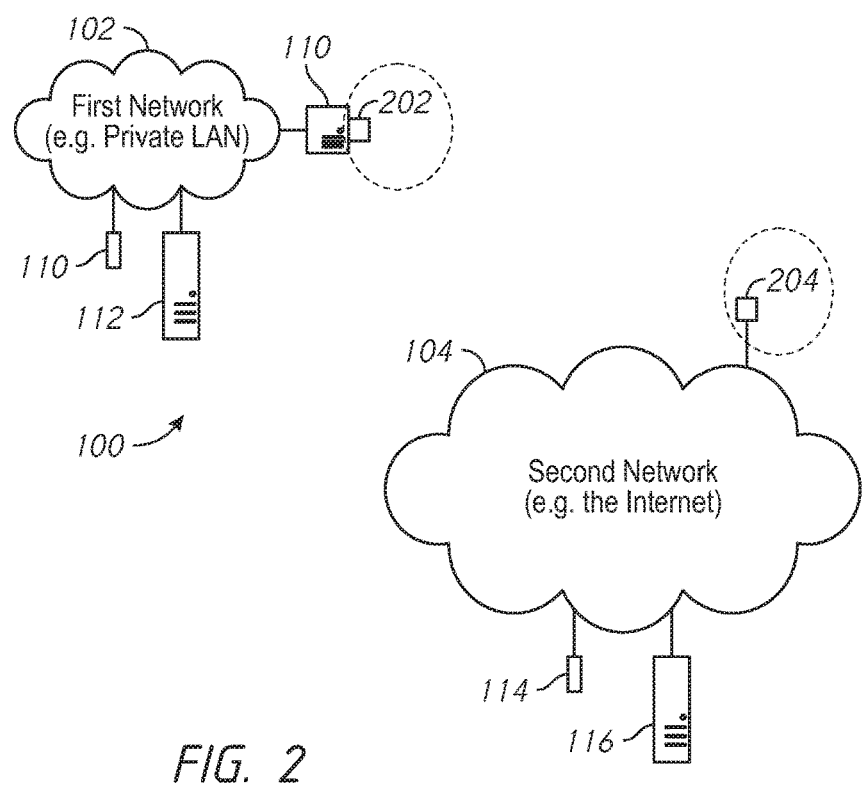
FIG. 2 is an illustration of the system of FIG. 1, where the first network includes a first pairing device embodied as a fixed-position connector and the second network includes a second pairing device embodied as a fixed-position connector, in accordance with some implementations.

FIG. 2 is an illustration of the system 100 of FIG. 1 where the first and the second networks 102 and 104 include one or more pairing devices 202 and 204 in accordance with some implementations of the present disclosure. As shown in FIG. 2, first network 102 includes pairing device 202 which is configured as a fixed-positioned connector coupled to first network 102 (e.g. via controller 110). In addition, second network 104 includes a pairing device 204 which is configured as a fixed-positioned connector coupled to second network 104.

Figure 3:
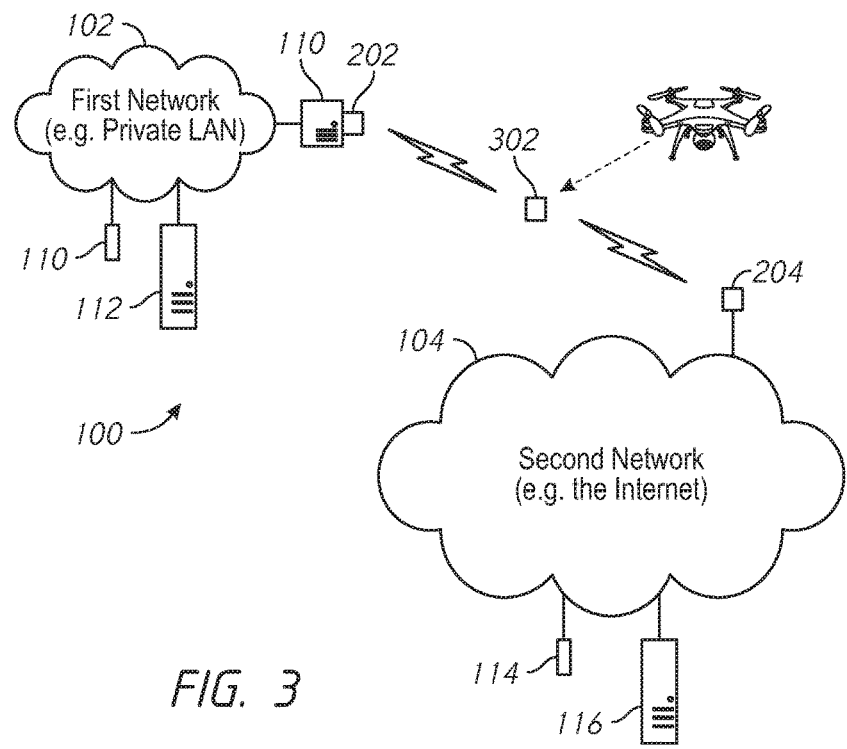
FIG. 3 is an illustration of the system of FIG. 2, where an intermediary pairing device (e.g. included in an unmanned aerial vehicle or UAV) is configured to pair with the first and the second pairing devices for establishing a temporary connection between the first network and the second network in accordance with some implementations.

FIG. 3 is an illustration of the system 100 of FIG. 2, where an intermediary pairing device 302 is shown between pairing devices 202 and 204. Intermediary pairing device 302 is configured to pair with pairing device 202 and to pair with pairing device 204, for providing a temporary connection between first network 102 and second network 104. Intermediary pairing device 302 facilitates the communication of data between first device 110 or server 112 of the first network 102 and second device 114 or server 116 of second network 104 over the temporary connection.

An intermediary pairing device may be a fixed-position device, a mobile device, or a mobile self-propelled device. As shown in FIG. 3, intermediary pairing device 302 may be included and carried in an unmanned aerial vehicle (UAV) or drone, or other suitable self-propelled vehicle, robot, or device. In some alternative implementations, intermediary pairing device 302 may be or include a mobile device, such as a smartphone or the like.

Such a pairing device, when configured to provide secure pairing, secure data communication, and/or cybersecurity for the network, may be referred to as a sentinel connector, a sentinel device, or just a "sentinel."

Figure 4:
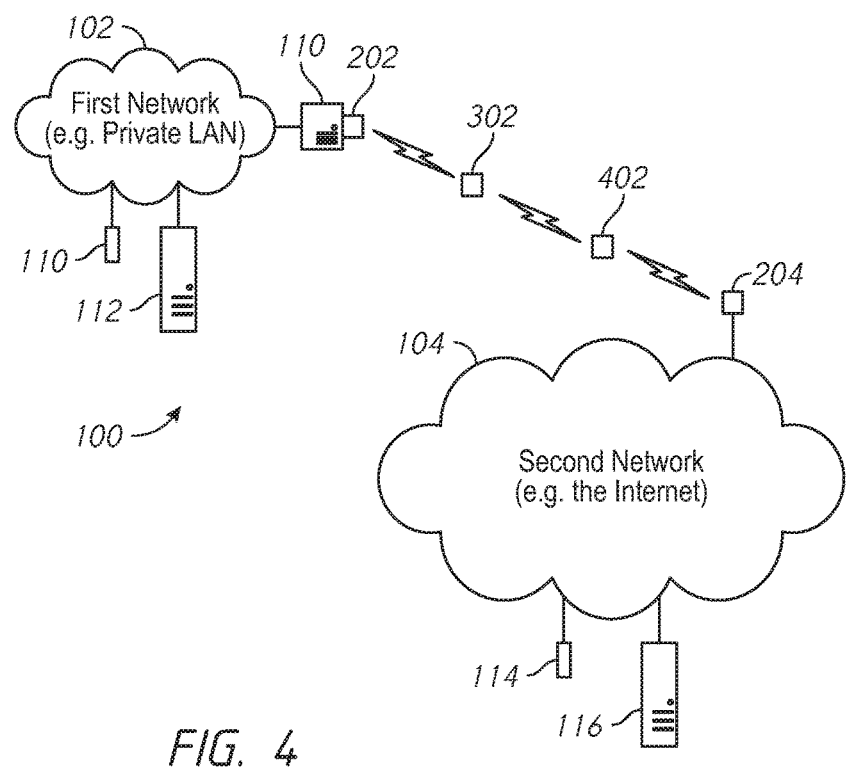
FIG. 4 is an illustration of the system of FIG. 2, where two intermediary pairing devices are configured to pair with the first and the second pairing devices, in a link chain, for establishing a temporary connection between the first network and the second network in accordance with some implementations.
Figure 5:
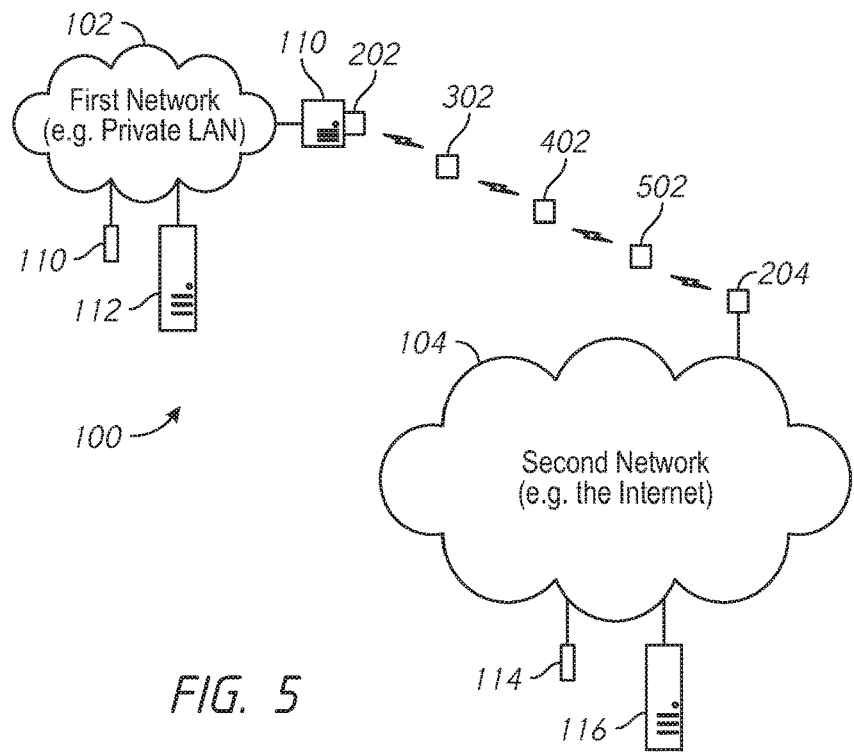
FIG. 5 is an illustration of the system of FIG. 2 where three intermediary pairing devices are configured to pair between the first and the second pairing devices, in a link chain, for establishing a temporary connection between the first network and the second network in accordance with some implementations.
Figure 6:
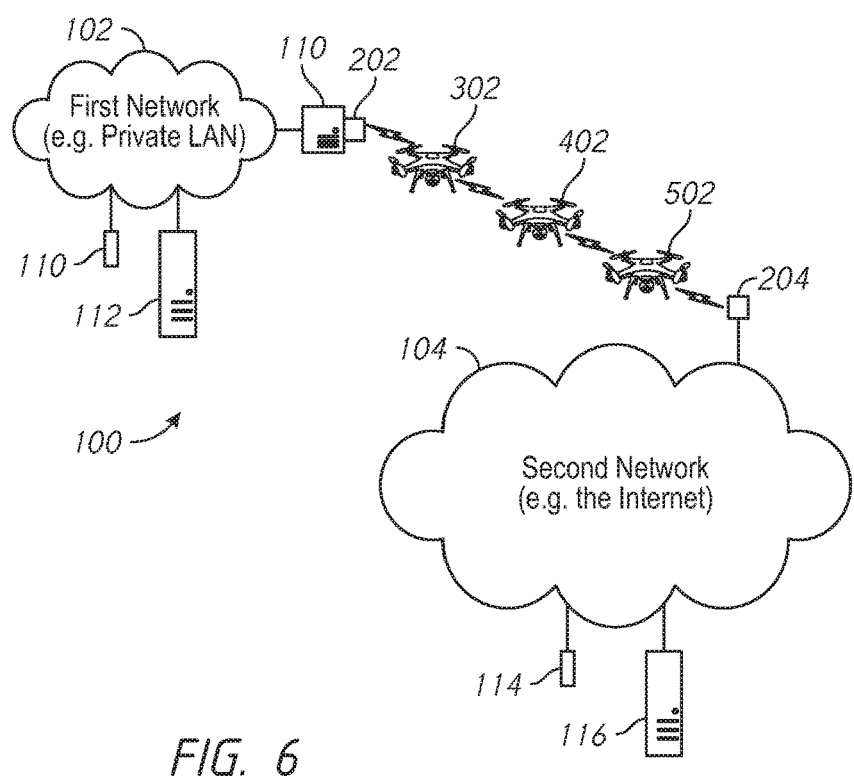
FIG. 6 is an illustration of the system of FIG. 5 where the three intermediary pairing devices are included in UAVs in a link chain in accordance with some implementations.

Any suitable number of intermediary pairing devices may be employed for pairing and connection. As an example, FIG. 4 shows that two intermediary pairing devices 302 and 402 may be employed in a link chain for pairing and connection. As another example, FIG. 5 shows that three intermediary pairing devices 302, 402, and 502 may be employed in a link chain for pairing and connection. In the example of FIG. 6, the three intermediary pairing devices 302, 402, and 502 of FIG. 5 are shown as being included and carried in a plurality of different UAVs.

Figure 7:
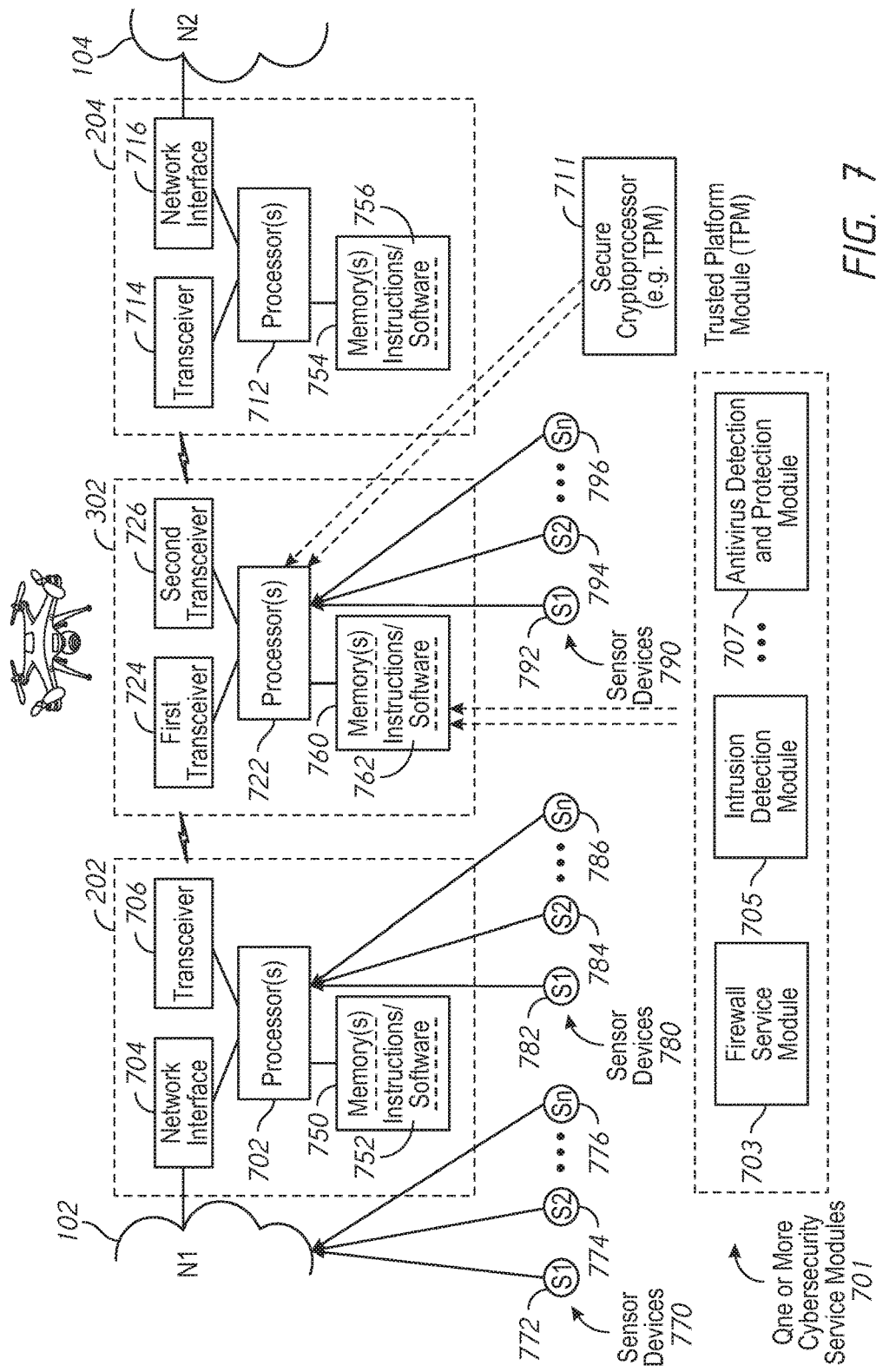
FIG. 7 is a schematic diagram of the pairing devices in the communication system of FIG. 3 in accordance with some implementations.

FIG. 7 is a schematic diagram of pairing devices 202, 204, and 302 in the communication system 100 of FIG. 3. As shown, intermediary pairing device 302 may include one or more processors 722, one or more memories 760 coupled to the one or more processors 722, and first and second transceivers 724 and 726 coupled to the one or more processors 722. First and second transceivers 724 and 726 may be wireless (i.e. non-wired) transceivers, radio frequency (RF) transceivers, or alternatively, optical transceivers configured to free-space optical communications.

The one or more processors 722 of intermediary pairing device 302 may further include a secure cryptoprocessor 711 configured to operate in accordance with a Trusted Platform Module (TPM). TPM is an international standard for a secure cryptoprocessor, a dedicated microcontroller which is configured to generate TPM-based encryption keys for various purposes in a device.

The one or more memories 760 may include instructions/software 762 in the form of one or more software modules for execution by the one or more processors 722. The one or more software modules may include one or more cybersecurity service modules 701 for executing one or more cybersecurity service functions. The one or more cybersecurity service modules 701 may include, for example, a firewall service module 703, an intrusion detection module 705, and/or an antivirus detection and protection module 707, to name but a few.

Intermediary pairing device 302 may be included as part of an apparatus which is an unmanned aerial vehicle (UAV) or drone, or other suitable self-propelled vehicle, robot, or device. In some implementations, intermediary pairing device 302 may be or include a mobile device, such as a smartphone or the like.

On the other hand, each one of pairing devices 202 and 204 of FIG. 7 may be part of a fixed-position connector, but otherwise have the same or similar make and construction as intermediary pairing device 302. More particularly, pairing device 202 may include one or more processors 702, one or more memories 750 coupled to the one or more processors 702, and a network interface 704 and a transceiver 706 coupled to the one or more processors 722. Transceiver 706 may be a wireless (i.e. non-wired) transceiver, an RF transceiver, or alternatively, an optical transceiver configured to free-space optical communications. Like intermediary pairing device 302, one or more processors 702 of pairing device 202 may include a secure cryptoprocessor configured to operate in accordance with a TPM. In addition, the one or more memories 750 may include instructions/software 752 in the form of one or more software modules for execution by the one or more processors 702, which may include one or more cybersecurity service modules for executing one or more cybersecurity service functions.

Similarly, pairing device 204 may include one or more processors 712, one or more memories 754 coupled to the one or more processors 712, and a network interface 716 and a transceiver 714 coupled to the one or more processors 712. Transceiver 714 may be a wireless (i.e. non-wired) transceiver, an RF transceiver, or alternatively, an optical transceiver configured to free-space optical communications. Like pairing devices 202 and 302, one or more processors 712 of pairing device 204 may include a secure cryptoprocessor configured to operate in accordance with a TPM. In addition, the one or more memories 754 may include instructions/software 756 in the form of one or more software modules for execution by the one or more processors 712, which may include one or more cybersecurity service modules for executing one or more cybersecurity service functions.

In some implementations, a plurality of sensor devices 770 (e.g. sensor devices 772, 774, and 776) may be connected in first network 102. In addition, a plurality of sensor devices may be included as part of or connected to each pairing device. More particularly in FIG. 7, pairing device 202 is shown to include a plurality of sensor devices 780 (e.g. sensor devices 782, 784, and 786) coupled to the one or more processors 702, and intermediary pairing device 302 is shown to include a plurality of sensor devices 790 (e.g. sensor devices 792, 794, and 796) coupled to the one or more processors 722. The one or more sensor devices may be or include, for example, a camera for ambient image or video data, a microphone for ambient sound data, a radio frequency (RF) receiver for ambient RF data, and a temperature sensor device for ambient temperature data.

The one or more processors 702 of pairing device 202 are configured to receive, from each one of the sensor devices 780, ambient sensor data and derive one or more signature features based on the ambient sensor data from each one of the sensor devices 780. A signature profile associated with pairing device 202 may be, include, or be derived from the one or more signature features. Similarly, the one or more processors 722 of intermediary pairing device 302 are configured to receive, from each one of the sensor devices 790, ambient sensor data and derive one or more signature features based on the ambient sensor data from each one of the sensor devices 790. A signature profile associated with intermediary pairing device 302 may be, include, or be derived from the one or more signature features.

Examples of signature features may be the detection of a predominant color in an image or video, the detection or a level of brightness, and the detection of an audio tone frequency. A signature profile of a pairing device may be used for verification, as a condition for establishing or maintaining a pairing. Such techniques will be described later in relation to FIGS. 11a, 11b, 11c, 12, and 13.

Figure 8:
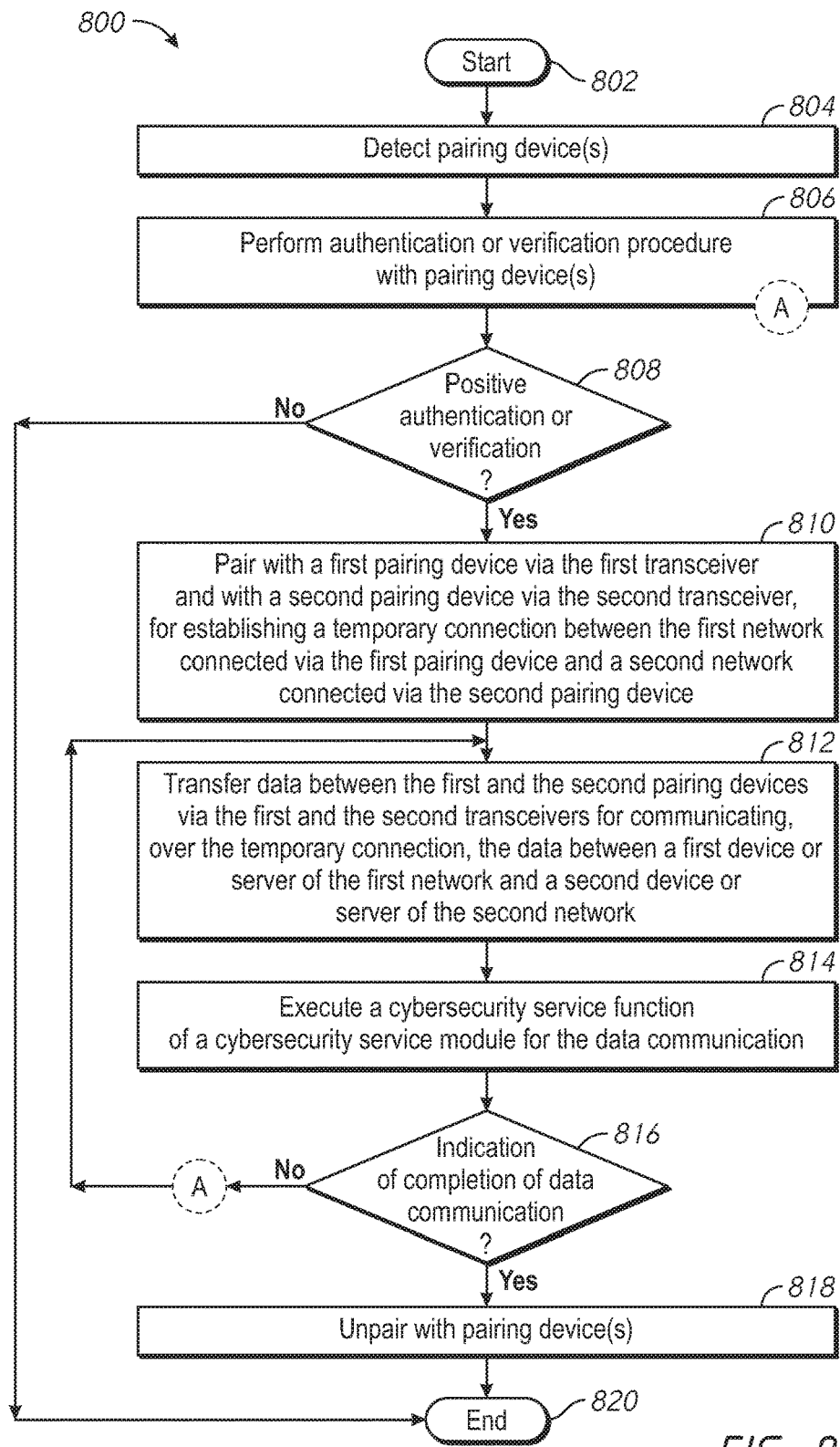
FIG. 8 is a flowchart for described a method for use in secure device pairing for secure network communication including cybersecurity in accordance with some implementations.

FIG. 8 is a flowchart 800 for describing a method for use in secure device pairing for secure network communication including cybersecurity. The secure device pairing may be for use in providing a temporary connection between a first network (e.g. a private LAN) and a second network (e.g. the Internet), when data communication between a first device or server of the first network and a second device or server of the second network is needed or desired.

The method of FIG. 8 may be embodied in a device, such as a pairing device (e.g. intermediary pairing device 302 of FIGS. 3 and 7, or alternatively pairing device 202 of FIGS. 3 and 7). The method may also be embodied as a computer program product including a non-transitory computer readable medium and instructions stored in the non-transitory computer readable medium, where the instructions are executable on one or more processors of the device (e.g. intermediary pairing device 302 of FIGS. 3 and 7, or alternatively pairing device 202 of FIGS. 3 and 7) for performing the steps of the method Beginning at a start block 802, the device detects one or more other pairing devices within its proximity for pairing (step 804 of FIG. 8). This may be achieved, for example, with use of a radio frequency (RF) transceiver to scan for other pairing devices. Once a pairing device is detected, the device performs an authentication or verification procedure with the detected device (step 806 of FIG. 8). The authentication or verification procedure may be performed for authenticating or verifying the device, the detected pairing devices, or both the device and the detected pairing devices (i.e. mutual authentication or verification). The authentication or verification procedure may be performed in accordance with use of one or more techniques described later in relation to FIGS. 9a, 9b, and 9c (see a connector A in relation to step 806 of FIG. 8).

If an indication of a negative authentication or verification is received (the "No" branch in step 808 of FIG. 8), then the flowchart ends at an end block 820 of FIG. 8. On the other hand, if an indication of a positive authentication or verification is received (the "Yes" branch in step 808), then the device may pair with a first pairing device via its first transceiver and with a second pairing device via its second transceiver, for establishing a temporary connection between the first network connected via the first pairing device and the second network connected via the second pairing device (step 810 of FIG. 8). See e.g. FIG. 3. Thus, a positive authentication or verification is used as a condition for device pairing.

After the temporary connection is established, the device may transfer data between the first and the second pairing devices via its first and the second transceivers for communicating, over the temporary connection, the data between a first device or server of the first network and a second device or server of the second network (step 812 of FIG. 8).

In some implementations, the data may be encrypted with use of an encryption key provided by a secure cryptoprocessor of one of the pairing devices. The secure cryptoprocessor may be configured to operate in accordance with a trusted platform module (TPM). As one example, the first device of the first network may be an IoT device or legacy device which receives the encryption key from a secure cryptoprocessor of any one of the pairing devices (e.g. pairing device 202) and thereafter encrypts the data with use of the received encryption key.

During the data communications, the device may execute a cybersecurity service function of one of its cybersecurity service modules (step 816 of FIG. 8). The cybersecurity service module may be, for example, a firewall service module configured to provide a firewall service function, an intrusion detection module configured to provide an intrusion detection function, or an antivirus detection and protection module configured to provide an antivirus detection and protection function, as a few examples.

If an indication of completion of data communication for first network is received (the "Yes" branch in step 816 of FIG. 8), then the device unpairs with the first and the second pairing devices (step 818 of FIG. 18) and the temporary connection is released or broken; the method ends at an end block 820 of FIG. 8. Otherwise (i.e. the "No" branch in step 816), the transferring of data with execution of the cybersecurity service function continues in steps 812 and 814 as shown in FIG. 8.

In some implementations, one or more continued authentication or verification procedures may be employed to maintain the device pairing and the temporary connection. The continued authentication or verification procedures may be performed for authenticating or verifying any one or all of the paired devices. The continued authentication or verification procedures may be performed in accordance with use of one or more techniques described later in relation to FIGS. 9a, 9b, and 9c (see a connector A in relation to the "No" branch step 816 of FIG. 8).

In alternative implementations of the method of FIG. 8, steps 810 and 812 are modified such that the intermediary pairing device pairs only with the first pairing device for a temporary connection with the first network, in order to provide a cybersecurity service function (e.g. an antivirus detection and protection function, or an intrusion detection function) for devices and/or servers in the first network. This cybersecurity service function may be regularly or periodically updated and provided to the first network.

Figure 9A:
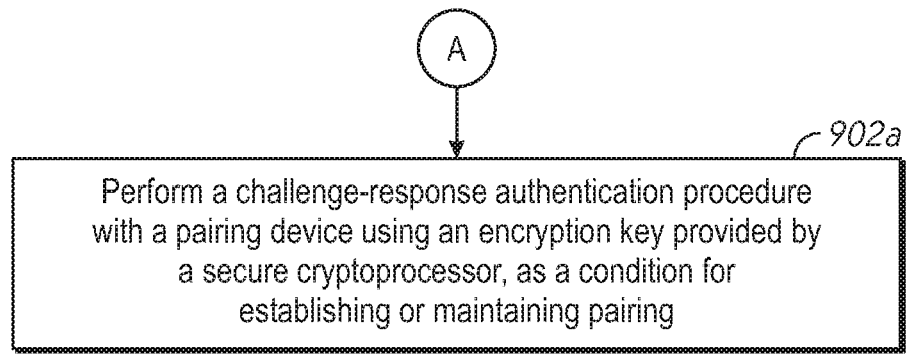
FIGS. 9a, 9b, and 9c are flowcharts for generally describing one or more authentication or verification procedures which may be employed by the pairing devices in accordance with some implementations.
Figure 9B:
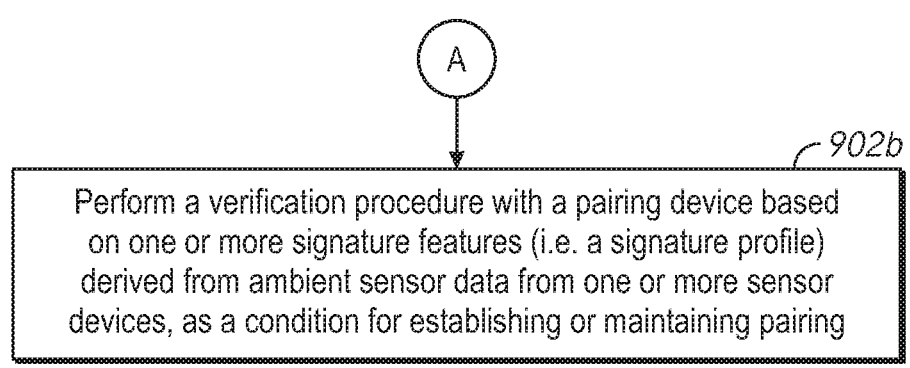
Figure 9C:
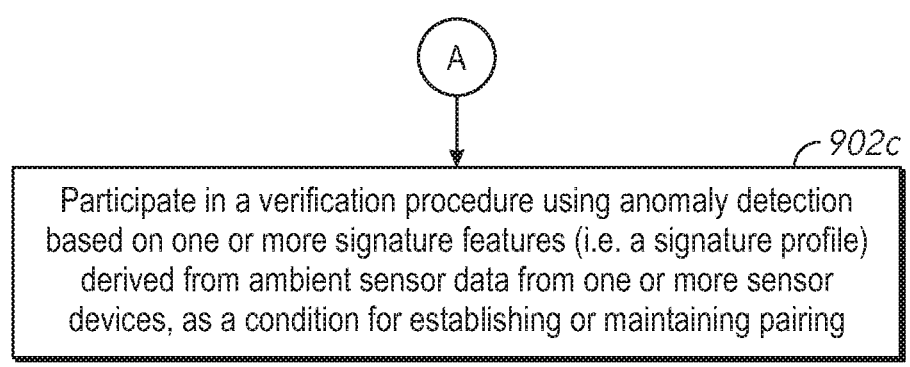

FIGS. 9a, 9b, and 9c are flowcharts for general describing authentication or verification procedures which may be employed by a pairing device. Such authentication or verification procedures may be used as a condition for establishing or maintaining device pairing. One or more these authentication or verification procedures of FIGS. 9a, 9b, and 9c may be employed in the method described in relation to FIG. 8.

In FIG. 9a, the pairing device may perform a challenge-response authentication procedure with a corresponding pairing device (step 902a of FIG. 9a). The challenge-response authentication procedure may be performed with use of an encryption key provided by the secure cryptoprocessor of the pairing device. Such an authentication or verification may be used as a condition for establishing or maintaining device pairing.

In FIG. 9b, the pairing device may perform a verification procedure with a corresponding pairing device (step 902b of FIG. 9b). In this case, the challenge-response authentication procedure may be performed based on one or more signature features (i.e. a signature profile) derived from ambient sensor data from one or more sensor devices. An example of such a technique is described later in relation to FIG. 11.

Again, such an authentication or verification may be used as a condition for establishing or maintaining device pairing.

In FIG. 9c, the pairing device may participate in a verification procedure using server-based anomaly detection (step 902c of FIG. 9c). This verification procedure may be performed based on one or more signature features (i.e. a signature profile) derived from ambient sensor data from one or more sensor devices. The server-based verification procedure may make use of a multimodal data fused neural network. Again, such an authentication or verification may be used as a condition for establishing or maintaining device pairing. Such a verification procedure may be performed as described later in relation to FIGS. 11a, 11b, 11c, and 13.

Figure 10:
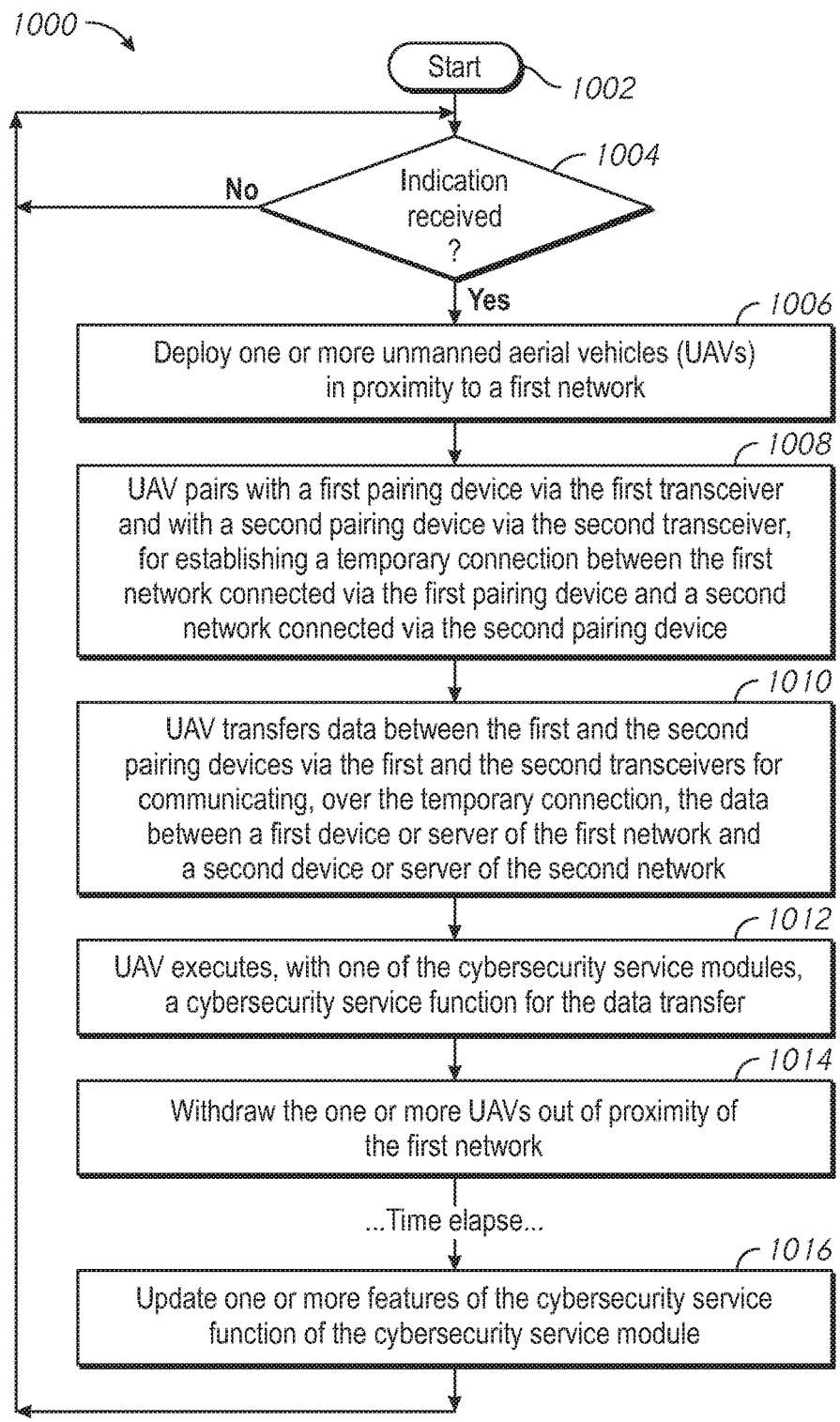
FIG. 10 is a flowchart for use in describing a network cybersecurity procedure for the first network in accordance with some implementations.

FIG. 10 is a flowchart 1000 for use in describing a network cybersecurity procedure for a network according to some implementations. The network cybersecurity procedure may be provided for a first network, for example, first network 102 shown in FIGS. 6 and 7. The network cybersecurity procedure involves use of one or more unmanned aerial vehicles (UAVs) (e.g. UAVs 702 of FIG. 7) or other suitable self-propelled vehicles, robots, or devices. In alternative implementations, the network cybersecurity procedure may involve use of a mobile device, such as a smartphone. Each UAV or other suitable device includes and carries an intermediary pairing device, for example, intermediary pairing device 302 shown and described earlier in relation to FIGS. 3 and 7.

Figure 13:
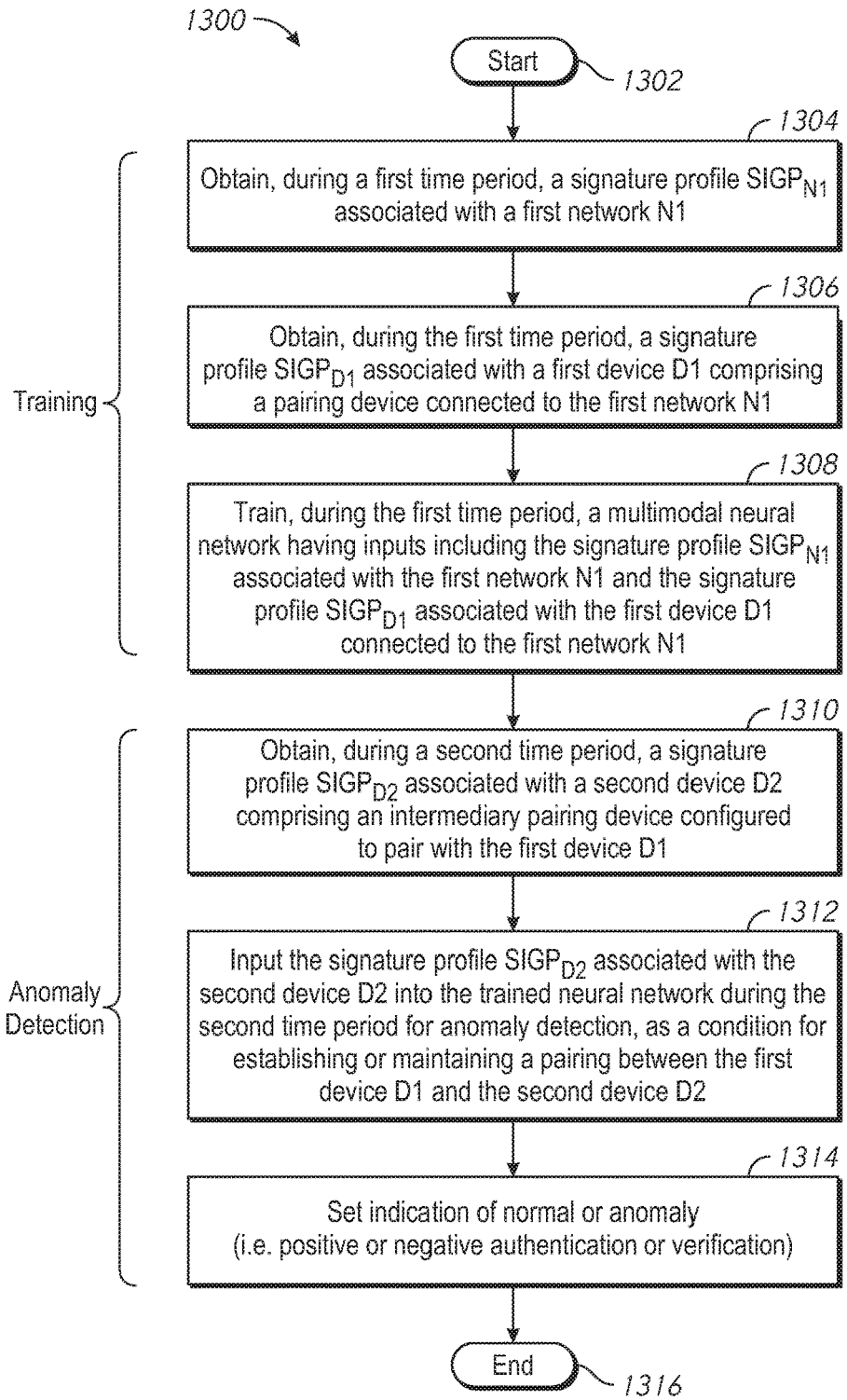
FIG. 13 is a flowchart for describing a verification procedure at a server using a multimodal data-fused neural network for anomaly detection, for use in context with e.g.

Beginning at a start block 1000 of FIG. 10, an indication or trigger for initiating the network cybersecurity procedure is received (step 1004 of FIG. 13). In response to the indication or trigger (the "Yes" branch in step 1004), the UAVs are deployed to locate themselves in proximity to the first network (step 1006 of FIG. 10). More particularly, the UAVs position themselves between and relative to the first pairing device and the second pairing device, such that their corresponding transceivers are in proximity and/or in alignment (e.g. for free-space optical communications).

Thereafter, a UAV operates to pair with a first pairing device via its first transceiver and with a second pairing device via its second transceiver (step 1008 of FIG. 10). The pairing is performed for establishing a temporary connection between the first network connected via the first pairing device and a second network connected via the second pairing device. The UAV operates to transfer data between the first and the second pairing devices via its first and second transceivers for communicating, over the temporary connection, the data between a first device or server of the first network and a second device or server of the second network (step 1010 of FIG. 10). During the data transfer, the UAV may operate to execute one of the cybersecurity service modules, a cybersecurity service function (step 1012 of FIG. 10). Note that steps 1008, 1010, and 1012 of FIG. 10 and related context may involve any of the details and techniques described herein in relation to FIGS. 8 and 9a, 9b, and 9c and otherwise.

When an indication of completion of data communication or other suitable indication is received, the one or more UAVs are withdrawn out of proximity of the first network (step 1014 of FIG. 10). The withdrawn UAVs may be relocated back to a facility or utilized in one or more other similar deployments. The devices are unpaired and the temporary connection is released or broken, where the first network may again be isolated from the second network.

After some time elapses, one or more features of the cybersecurity service function or module may be updated (step 1016 of FIG. 10). When another indication or trigger for again performing the network cybersecurity procedure is received, as indicated in step 1004 of FIG. 10, the same or similarly-configured UAVs may be redeployed to again locate themselves in proximity to the first network for the same, similar, or even other related or unrelated purpose and function. If the same or similar purpose and function is advanced, the UAV will utilize the cybersecurity service module and function having the one or more updated features.

Figure 11A:
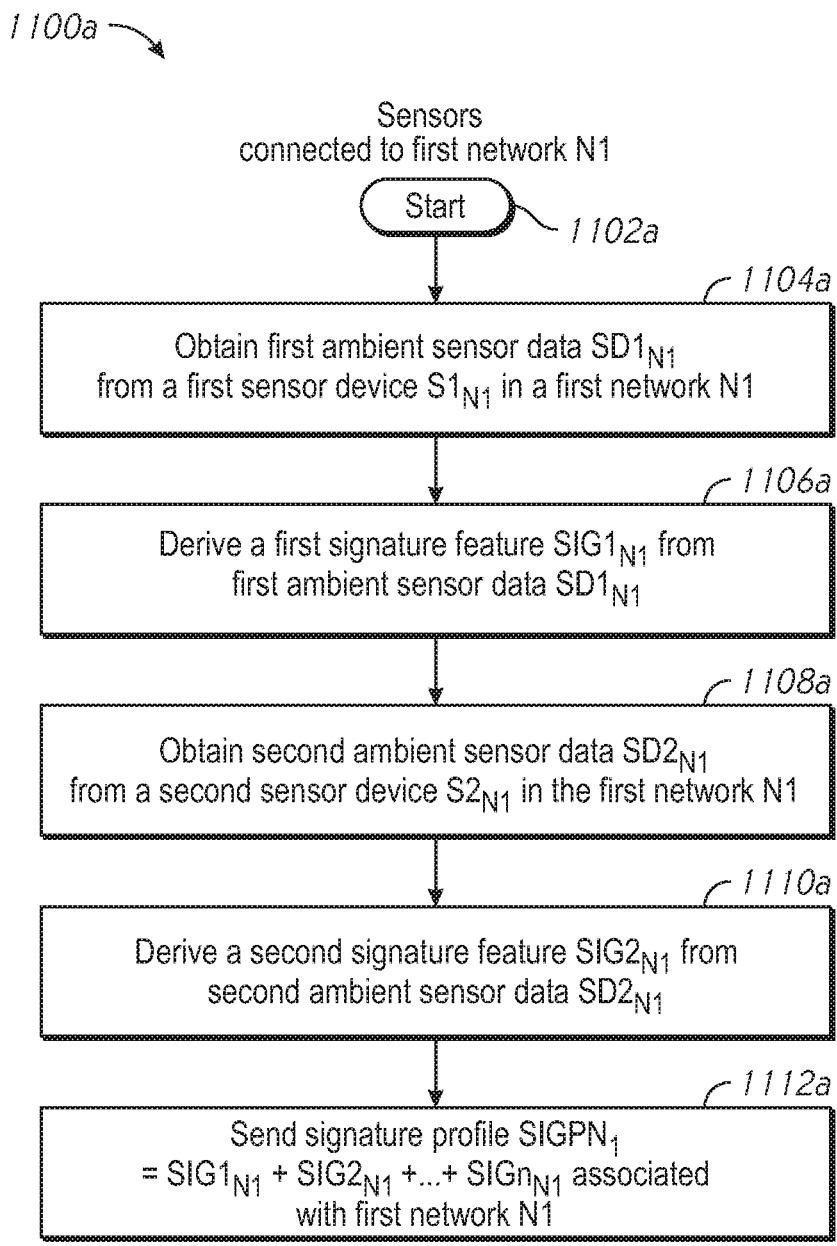
FIGS. 11a, 11b, and 11c are flowcharts for describing methods of participating in a verification procedure for use in context with FIGS. 8 and 9c, and in relation to the methods of FIGS. 12 and 13.
Figure 11B:
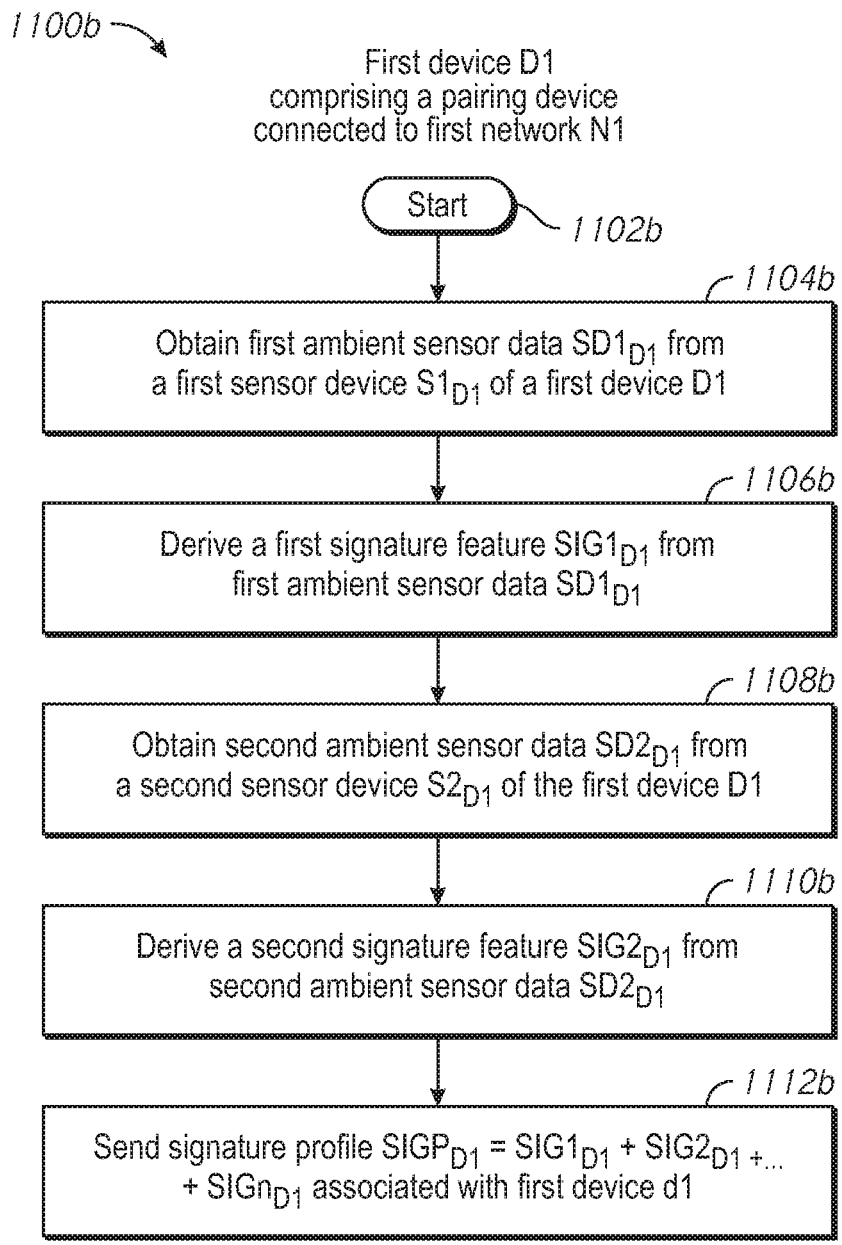
Figure 11C:
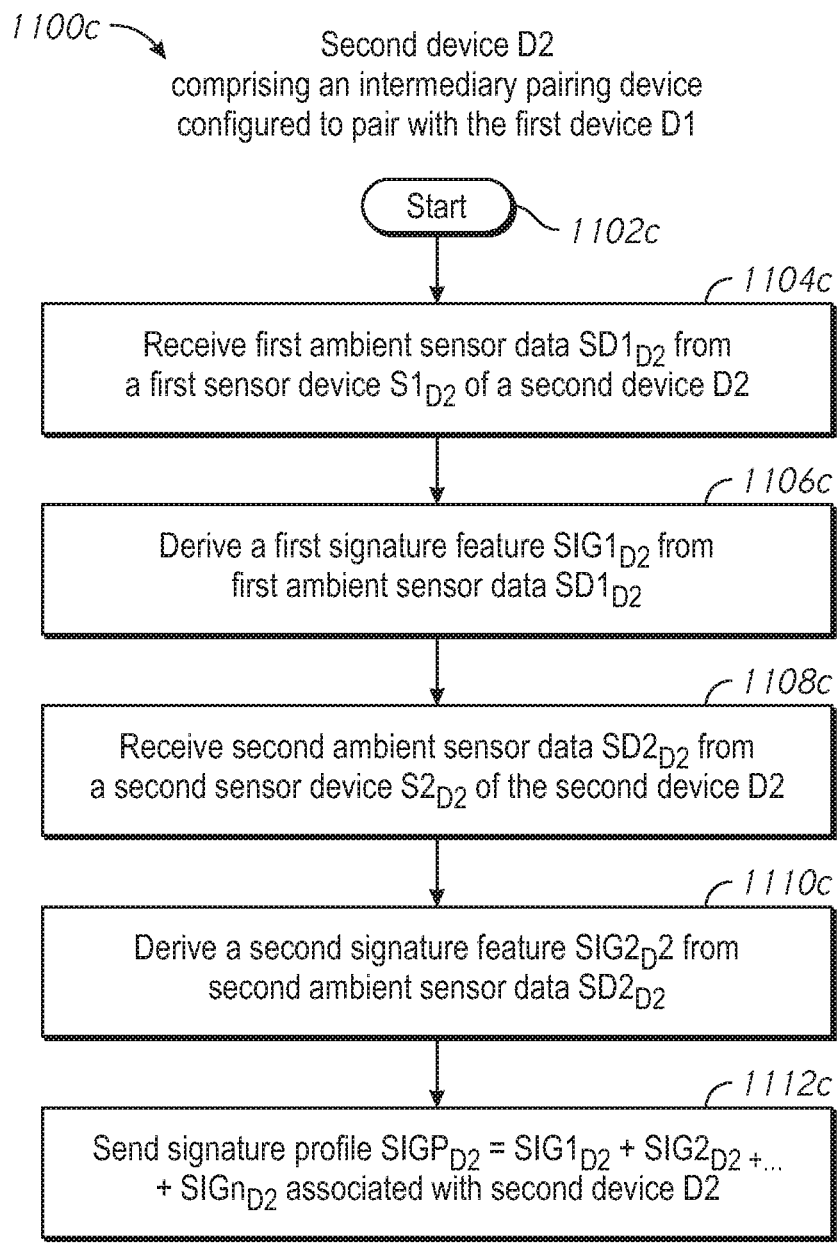
Figure 12:
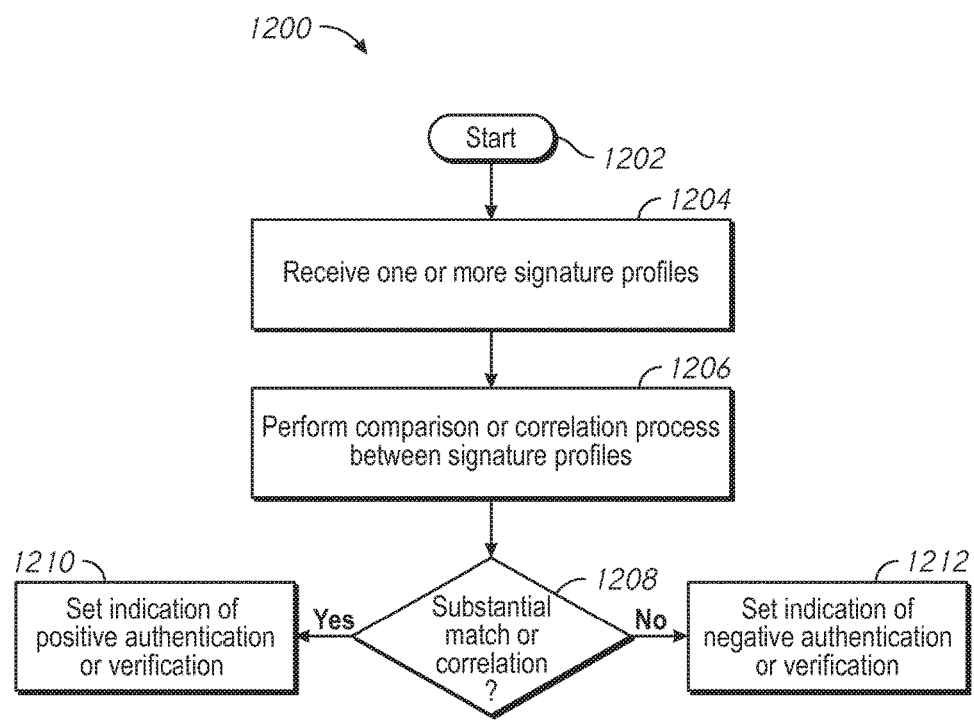
FIG. 12 is a flowchart for describing a method of performing an authentication or verification procedure based on ambient sensor data in the context of FIG. 9b with use of one or more of the methods of FIGS. 11a, 11b, and/or 11c.

FIGS. 11a, 11b, and 11c are flowcharts 1100a, 1100b, and 1100c for describing methods of participating in a verification procedure, for example, for use in context with FIGS. 8 and 9c, and in relation to either one of the methods of FIGS. 12 and 13. The methods of FIGS. 11a, 11b, and 11c may be performed by a network or a device, such as a pairing device (e.g. pairing device 202 or 302 of FIGS. 3 and 7). The methods of FIGS. 11a, 11b, and 11c, may make use of the sensor devices described in relation to FIG. 7. Each of the methods may also be embodied as a computer program product including a non-transitory computer readable medium and instructions stored in the non-transitory computer readable medium, where the instructions are executable on one or more processors for performing the steps of the method. Note that the method of FIG. 13 may be described in combination with reference to FIGS. 3 and 7.

In the method of FIG. 11a, the plurality of sensor devices 770 connected in first network 102 as shown of FIG. 7 may be utilized. Beginning at a start block 1102a of FIG. 11a, first ambient sensor data $SD1_{N1}$ from a first sensor device $S1_{N1}$ in the first network N1 may be obtained (step 1104a of FIG. 11a). A first signature feature $SIG1_{N1}$ may be derived from the first ambient sensor data $SD1_{N1}$ (step 1106a of FIG. 11a). In addition, second ambient sensor data $SD2_{N1}$ from a second sensor device $S2_{N1}$ in the first network N1 may be obtained (step 1108a of FIG. 11a) A second signature feature $SIG2_{N1}$ may be derived from the second ambient sensor data $SD2_{N1}$ (step 1110a of FIG. 11a). Additional signature features may be obtained in the same or similar manner. A signature profile $SIGP_{N1}$ may be, include, or be derived from $SIG1_{N1}+SIG2_{N1}+\ldots+SIGn_{N1}$. The signature profile $SIGP_{N1}$ may be sent to a server or another device for verification. The signature profile $SIGP_{N1}$ may be processed in accordance with either one or both of the methods described in relation to FIGS. 12 and 13.

In the method of FIG. 11b, the plurality of sensor devices 780 of pairing device 202 as shown in FIG. 7 may be utilized. Beginning at a start block 1102b of FIG. 11b, first ambient sensor data $SD1_{D1}$ from a first sensor device $S1_{D1}$ of the first device D1 may be obtained (step 1104b of FIG. 11b) A first signature feature $SIG1_{D1}$ may be derived from the first ambient sensor data $SD1_{D1}$ (step 1106b of FIG. 11b). In addition, second ambient sensor data $SD2_{D1}$ from a second sensor device $S2_{D1}$ of the first device D1 may be obtained (step 1108b of FIG. 11b) A second signature feature $SIG2_{D1}$ may be derived from the second ambient sensor data $SD2_{D1}$ (step 1110b of FIG. 11b). Additional signature features may be obtained in the same or similar manner. A signature profile $SIGP_{D1}$ associated with first device D1 may be, include, or be derived from $SIG1_{D1}+SIG2_{D1}+\ldots+SIGn_{D1}$. The signature profile $SIGP_{D1}$ may be sent to a server or another device for verification. The signature profile $SIGP_{D1}$ may be processed in accordance with either one or both of the methods described in relation to FIGS. 12 and 13.

In the method of FIG. 11c, the plurality of sensor devices 790 of pairing device 302 (i.e. the intermediary pairing device) as shown in FIG. 7 may be utilized. Beginning at a start block 1102c of FIG. 11c, first ambient sensor data $SD1_{D2}$ from a first sensor device $S1_{D2}$ of the second device D2 may be obtained (step 1104c of FIG. 11c) A first signature feature $SIG1_{D2}$ may be derived from the first ambient sensor data $SD1_{D2}$ (step 1106c of FIG. 11c). In addition, second ambient sensor data $SD2_{D2}$ from a second sensor device $S2_{D2}$ of the second device D2 may be obtained (step 1108c of FIG. 11c) A second signature feature $SIG2_{D2}$ may be derived from the second ambient sensor data $SD2_{D2}$ (step 1110c of FIG. 11c). Additional signature features may be obtained in the same or similar manner. A signature profile $SIGP_{D2}$ associated with second device D2 may be, include, or be derived from $SIG1_{D2}+SIG2_{D2}+\ldots+SIGn_{D2}$. The signature profile $SIGP_{D2}$ may be sent to a server or another device for verification. The signature profile $SIGP_{D2}$ may be processed in accordance with either one or both of the methods described in relation to FIGS. 12 and 13.

With respect to each one of the methods of FIGS. 11a, 11b, and 11c, note that any one or all of the devices and the network may additionally generate and inject a detectable signal into the local environment. For example, the network or device may generate and inject a light having a particular color, an audio tone having a particular frequency, an audio tone with a particular cadence, etc. These signals may be utilized for a more efficient or reliable verification, and/or for creating identifiable signatures associated with the network and devices.

FIG. 12 is a flowchart 1200 for describing a method of performing an authentication or verification procedure based on ambient sensor data in the context of FIG. 9b with use of one or more of the methods of FIGS. 11a, 11b, and/or 11c. The method of FIG. 12 may be embodied in a server or a device, such as a pairing device (e.g. intermediary pairing device 302 of FIGS. 3 and 7, or alternatively pairing device 202 of FIGS. 3 and 7). The method may also be embodied as a computer program product including a non-transitory computer readable medium and instructions stored in the non-transitory computer readable medium, where the instructions are executable on one or more processors for performing the steps of the method.

Beginning at a start block 1202 of FIG. 12, the server or device may receive one or more signature profiles associated with a network or a device (e.g. a pairing device) (step 1204 of FIG. 12). A signature profile may be associated with a network or a device, and may be or include a set of signature features associated with the surrounding location (i.e. signature features derived from ambient sensor data of one or more sensors). The one or more signature profiles may be any one or more of the signature profiles sent in relation to steps 1112a, 1112b, and 1112c of FIGS. 11a, 11b, and 11c, respectively.

The server or devices may perform a comparison or correlation process between signature profiles (step 1206 of FIG. 12). If there is a substantial match or correlation between the signature profiles (as identified in step 1208 of FIG. 12), then the associated device is positively verified and an indication of the same (i.e. positive verification indication) is set (step 1210 of FIG. 12). Otherwise, if there is no substantial match or correlation between the pertinent signature profiles as identified in step 1208, then the associated device is not positively verified and an indication of the same (i.e. negative verification indication) is set (step 1212 of FIG. 12).

As one example, the server or device may receive from the first network N1 the signature profile $SIGP_{N1}$ associated with the first network N1, as well as receive from a second device D2 a signature profile $SIGP_{D2}$ associated with the second device D2. If there is a substantial match or correlation between signature profiles $SIGP_{D2}$ and $SIGP_{N1}$, then the second device D2 is positively verified and may maintain its pairing relationship. Otherwise, the second device D2 is not positively verified where it is unpaired.

As another example, the server or device may receive from a first device D1 the signature profile $SIGP_{D1}$ associated with the first device D1, receive from a second device D2 a signature profile $SIGP_{D2}$ associated with the second device D2, and receive from the first network N1 the signature profile $SIGP_{N1}$ associated with the first network N1. If there is a substantial match or correlation between signature profile $SIGP_{D1}$ and both signature profiles $SIGP_{N1}$ and $SIGP_{D2}$ then the first device D1 is positively verified and may maintain its pairing relationship. Also, if there is a substantial match or correlation between signature profile $SIGP_{D2}$ and both signature profiles $SIGP_{N1}$ and $SIGP_{D1}$ then the second device D2 is positively verified and may maintain its pairing relationship. Otherwise, the devices are not positively verified and therefore unpaired.

FIG. 13 is a flowchart for describing a verification procedure for verifying one or more pairing devices of the present disclosure using a multimodal data-fused neural network for anomaly detection. The method of FIG. 13 may be embodied in a server of a network (e.g. a server of first or second networks 102 or 104). The method may also be embodied as a computer program product including a non-transitory computer readable medium and instructions stored in the non-transitory computer readable medium, where the instructions are executable on one or more processors of the server for performing the steps of the method. Note that the method of FIG. 13 may be described in combination with reference to FIGS. 3 and 7.

Beginning at a start block 1302 of FIG. 13, the server may obtain, during a first time period, a signature profile $SIGP_{N1}$ associated with a first network N1 (step 1304 of FIG. 13). For the first network N1, see e.g. first network 102 of FIGS. 3 and 7. The signature profile $SIGP_{N1}$ may be based on at least a first signature feature $SIG1_{N1}$ of the first network N1 and a second signature feature $SIG2_{N1}$ of the first network N1. The first signature feature $SIG1_{N1}$ may be derived from first ambient sensor data $SD1_{N1}$ from a first sensor device $S1_{N1}$ in the first network N1, and the second signature feature $SIG2_{N1}$ may be derived from second ambient sensor data $SD2_{N1}$ from a second sensor device $S2_{N1}$ in the first network N1. See e.g. sensors 772 and 774 connected in first network 102 of FIG. 7.

In addition, the server may obtain, during the first time period, a signature profile $SIGP_{D1}$ associated with a first device D1 comprising a pairing device connected to the first network N1 (step 1306 of FIG. 13). The pairing device may be included in a fixed-position connector in the first network N1. For the first device D1, see e.g. pairing device 202 connected to first network 102 in FIGS. 3 and 7. The signature profile $SIGP_{D1}$ may be based on at least a first signature feature $SIG1_{D1}$ of the first device D1 and a second signature feature $SIG2_{D1}$ of the first device D1. The first signature feature $SIG1_{D1}$ may be derived from first ambient sensor data $SD1_{D1}$ from a first sensor device $S1_{D1}$ of the first device D1, and the second signature feature $SIG2_{D1}$ may be derived from second ambient sensor data $SD2_{D1}$ from a second sensor device $S2_{D1}$ of the first device D1. The first sensor device $S1_{D1}$ may be the first type of sensor device and the second sensor device $S2_{D1}$ may be the second type of sensor device. See e.g. sensors 782 and 784 of pairing device 202 connected to first network 102 of FIG. 7.

The first and the second type of sensor devices may be, for example, a camera for ambient image or video data, a microphone for ambient sound data, a radio frequency (RF) receiver for ambient RF data, and a temperature sensor device for ambient temperature data.

The server may operate to train, during the first time period, the multimodal data-fused neural network having inputs which include the signature profile $SIGP_{N1}$ associated with the first network N1 and the signature profile $SIGP_{D1}$ associated with the first device D1 (step 1308 of FIG. 13).

After the training, the server may obtain, during a second time period, a signature profile $SIGP_{D2}$ associated with a second device D2 comprising an intermediary pairing device configured to pair with the first device D1 (step 1310 of FIG. 13). The intermediary pairing device may, for example, be included in an unmanned aerial vehicle (UAV). For second device D2, see e.g. intermediary pairing device 302 of FIGS. 3 and 7. The signature profile $SIGP_{D2}$ may be based on at least a first signature feature $SIG1_{D2}$ of the second device D2 and a second signature feature $SIG2_{D2}$ of the second device D2. The first signature feature $SIG1_{D2}$ may be derived from first ambient sensor data $SD1_{D2}$ from a first sensor device $S1_{D2}$ of the second device D2, and the second signature feature $SIG2_{D2}$ may be derived from second ambient sensor data $SD2_{D2}$ from a second sensor device $S2_{D2}$ of the second device D2. The first sensor device $S1_{D2}$ may be the first type of sensor device and the second sensor device $S2_{D2}$ may be the second type of sensor device. See e.g. sensors 792 and 794 of intermediary pairing device 302 of FIG. 7.

The server may then input, during the second time period, the signature profile $SIGP_{D2}$ associated with the second device D2 into the trained neural network for anomaly detection (step 1312 of FIG. 13). The trained neural network will output an indication for a normal or anomaly condition. The server may set an indication for a normal or anomaly condition based on this output (step 1314 of FIG. 13). Such verification may be used as a condition for establishing or maintaining a pairing between the first device D1 and the second device D2, for establishing a temporary connection between the first network N1 connected via the first device D1 and a second network connected via a third pairing device to which the second device D2 is paired. The flowchart ends at an end block 1316 of FIG. 13, but may be repeated if and as needed.

Figure 14:
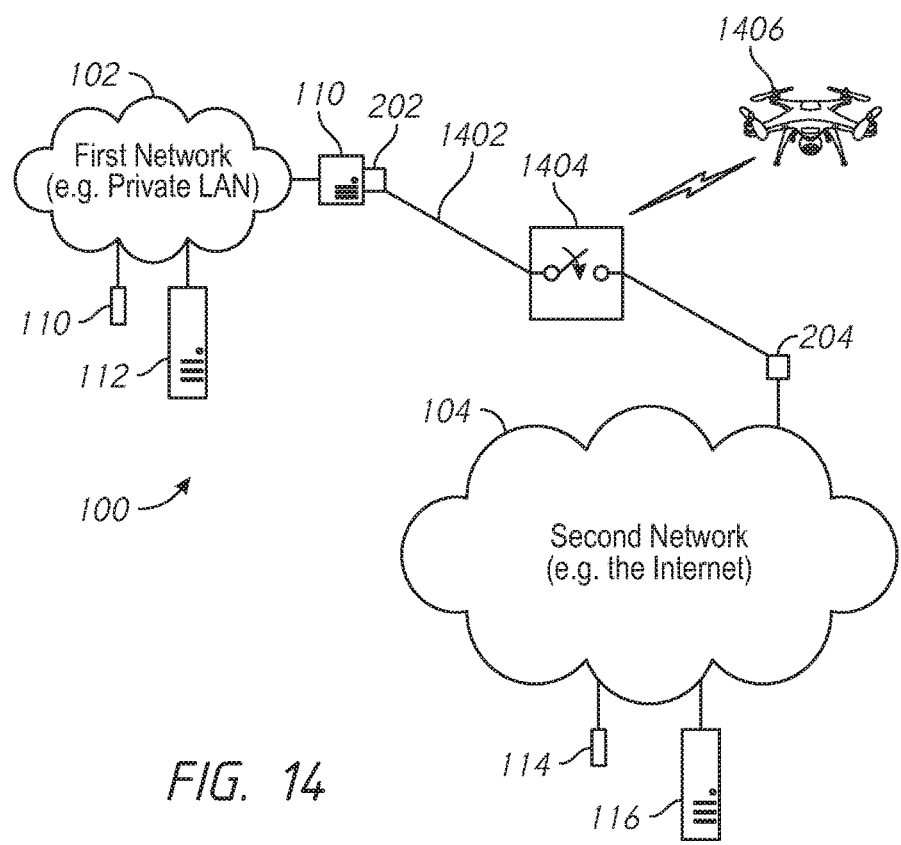
FIG. 14 is an illustration of the system of FIG. 3, where an alternative implementation of the present disclosure may be utilized.

FIG. 14 is an illustration of the system 100 of FIG. 3, where an alternative implementation of the present disclosure is shown. First network 102 and second network 104 may be connected through devices/connectors 202 and 204 via a wired or wireless connection 1402. A device 1404 comprising a switch or a bridge (e.g. an optical bridge) may be provided along or in between connection 1402, for making or breaking the network connection. In some implementations, device 1404 comprising the switch or bridge is provided as part of one of the devices/connectors 202 and 204.

In FIG. 14, the switch or bridge of device 1404 may be open or closed via a control signal provided from a device 1406. The control signal may be an electronic, magnetic, or wireless control signal. The closing of the switch provides a temporary connection between first network 102 and second network 104. In some implementations, device 1406 is included and carried in an apparatus such as an unmanned aerial vehicle (UAV), where a wireless control signal is provided from the device 1406. In some implementations, devices 1404 and 1406 may be pairing devices which pair with each other so that device 1406 can provide a control signal for closing the switch of device 1404. The alternative implementation of FIG. 14 may employ any one or more combinations of components and techniques as described in relation to the previous figures, for secure device pairing and communication.

Figure 15:
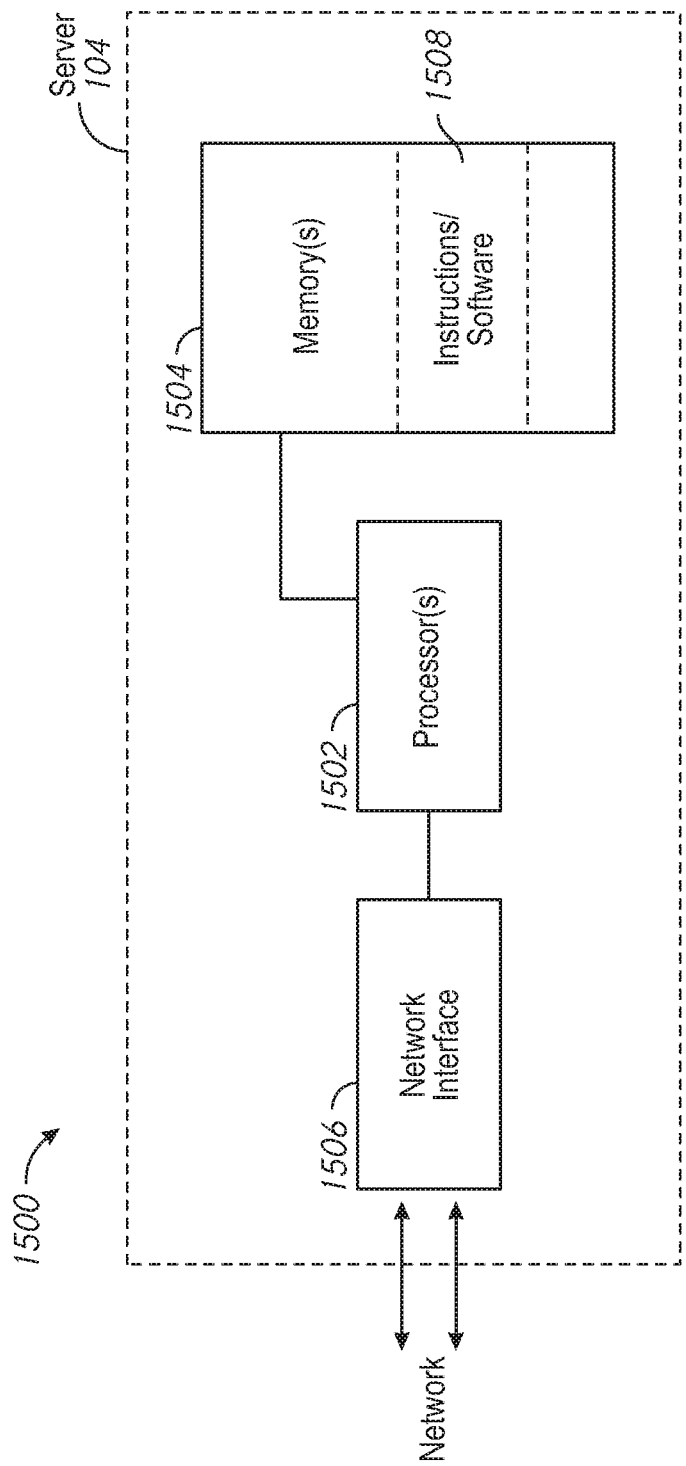
FIG. 15 is a schematic block diagram of a server which may be utilized in the techniques described herein.

FIG. 15 is a schematic block diagram of a server (e.g. server 112 or other for use with techniques described herein, including the method of FIG. 11 and/or FIG. 13). Server 112 of FIG. 15 has components which may include one or more processors 1502 which are coupled to memory 1504 and to a network interface 1506. Network interface 1506 is configured to connect to one or more networks (e.g. first network 102 of FIG. 1) for communications. The one or more processors 1502 of the server are configured to operate according to instructions 1508 stored in memory 1504, in order to perform basic operations as well as to perform additional techniques of the present disclosure (e.g. techniques described in relation to FIG. 11 and/or 13).

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. An apparatus, comprising:
an intermediary pairing device, including:
one or more processors; and
first and second transceivers coupled to the one or more processors,
wherein the apparatus comprises an unmanned aerial vehicle (UAV) or other self-propelled vehicle, robot, or device which carries the intermediary pairing device and the one or more processors are configured to:
deploy the UAV to position the intermediary pairing device in proximity to a first pairing device and a second pairing device;
pair with the first pairing device via the first transceiver and with the second pairing device via the second transceiver, the pairing establishing a temporary connection between a first network connected via the first pairing device and a second network connected via the second pairing device;
transfer data between the first and the second pairing devices via the first and the second transceivers for communicating, over the temporary connection, the data between a first device or server of the first network and a second device or server of the second network;
execute a cybersecurity service function of a cybersecurity service module for the data transfer;
withdraw the UAV to position the intermediary pairing device out of proximity of at least one of the first or the second pairing devices wherein the temporary connection is broken;
receive an update to one or more features of the cybersecurity service module; and
in response to receiving an update, deploying the same UAV or similarly-configured apparatus to again position the intermediary pairing device in proximity to the first and the second pairing devices for again pairing and establishing a temporary connection, transferring data, and executing an updated cybersecurity service function.

2. The apparatus of claim 1, wherein the cybersecurity service module comprises one of a firewall service module, an intrusion detection module, and an antivirus detection and protection service module.

3. The apparatus of claim 1, wherein the one or more processors include a secure cryptoprocessor configured to operate in accordance with a Trusted Platform Module (TPM), the secure cryptoprocessor being configured to provide an encryption key to the first device or server for encryption of the data.

4. The apparatus of claim 1, wherein the one or more processors include a secure cryptoprocessor configured to operate in accordance with a Trusted Platform Module (TPM), the one or more processors being further configured to:
perform, with the first pairing device, a challenge-response authentication procedure with use of an encryption key provided by the secure cryptoprocessor, as a condition for establishing or maintaining the pairing with the first pairing device.

5. The apparatus of claim 1, further comprising:
one or more sensor devices coupled to the one or more processors; wherein the one or more processors are further configured to:
receive, from each one of the sensor devices, ambient sensor data; derive one or more signature features based on the ambient sensor data from each one of the sensor devices for producing a signature profile of the intermediary pairing device; and
wherein the signature profile of the intermediary pairing device is used for verification of the intermediary pairing device as a condition for establishing or maintaining the pairing with the first device.

6. The apparatus of claim 5, wherein the one or more sensor devices comprise two or more of the following: a camera for ambient image or video data, a microphone for ambient sound data, a radio frequency (RF) receiver for ambient RF data, and a temperature sensor device for ambient temperature data.

7. The apparatus of claim 1, further comprising:
wherein the first network comprises a private network and the second network which comprises a public network such as the Internet; or
wherein the first device or server of the first network comprises an Internet of Things (IoT) device; or
wherein the first and the second transceivers comprises optical transceivers configured for free-space optical communications with the first and the second pairing devices.

8. A method comprising:
causing a network cybersecurity procedure to be provided for a first network, the network cybersecurity procedure involving use of at least one unmanned aerial vehicle (UAV), the network cybersecurity protocol comprising:
deploying the UAV in proximity to the first network, wherein the UAV is configured to:
pair with a first pairing device and with a second pairing device for establishing a temporary connection between a first network connected via the first pairing device and a second network connected via the second pairing device,
communicate data between the first and the second pairing devices for communicating the data between a first device or server of the first network and a second device or server of the second network, and
execute a cybersecurity service function of a cybersecurity service module for the data transfer;
withdrawing the at least one UAV out of the proximity of the first network;
updating one or more features of the cybersecurity service module; and
deploying the same or similarly-configured UAV in the proximity of the first network, wherein the UAV is configured to:
pair with the first pairing device and with the second pairing device, for establishing a temporary connection between the first network connected via the first pairing device and the second network connected via the second pairing device,
communicate data between the first and the second pairing devices for communicating the data between a first device or server of the first network and a second device or server of the second network, and
execute, with the updated cybersecurity service module, the cybersecurity service function for the data transfer, wherein the updated cybersecurity service module includes the one or more updated features.

9. The method of claim 8, further comprising:
wherein the pairing and communicating are performed with use of optical transceivers configured for free space optical communications with the first and the second pairing devices; or
wherein the cybersecurity service module comprises a firewall service module, an intrusion detection module, and an antivirus detection and protection service module.

10. The method of claim 8, wherein the one or more cybersecurity service modules comprise a Trusted Platform Module (TPM), wherein the UAV:
performs, with the first pairing device, a challenge-response authentication procedure with use of an encryption key provided by the TPM, as a condition for establishing or maintaining the pairing with the first pairing device.

11. The method of 8, wherein the UAV is further configured to:
receive, from each one of one or more sensor devices, ambient sensor data; derive one or more signature features based on the ambient sensor data from each one of the sensor devices for producing a signature profile associated with the intermediary pairing device; and
wherein the signature profile associated with the intermediary pairing device is used for verification of the intermediary pairing device as a condition for establishing or maintaining the pairing with the first and/or the second device.

* * * * *